(12) United States Patent
Kaiser et al.

(10) Patent No.: US 6,976,065 B2
(45) Date of Patent: Dec. 13, 2005

(54) MECHANISM FOR RECONFIGURING A SERVER WITHOUT INCURRING SERVER DOWN TIME

(75) Inventors: Christian Kaiser, Cupertino, CA (US); Rick Swift, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 675 days.

(21) Appl. No.: 09/792,805

(22) Filed: Feb. 23, 2001

(65) Prior Publication Data

US 2002/0120724 A1   Aug. 29, 2002

(51) Int. Cl.[7] ............................................. G06F 15/177
(52) U.S. Cl. ........................ 709/221; 709/220; 713/100
(58) Field of Search ........ 713/1, 2, 100; 709/220–222, 709/250, 223, 224

(56) References Cited

U.S. PATENT DOCUMENTS

| | | | | |
|---|---|---|---|---|
| 5,165,018 A | * | 11/1992 | Simor | 709/222 |
| 5,659,786 A | * | 8/1997 | George et al. | 713/100 |
| 5,682,529 A | * | 10/1997 | Hendry et al. | 713/100 |
| 5,727,208 A | * | 3/1998 | Brown | 713/100 |
| 5,784,563 A | * | 7/1998 | Marshall et al. | 709/221 |
| 5,822,531 A | * | 10/1998 | Gorczyca et al. | 709/221 |
| 6,009,274 A | | 12/1999 | Fletcher et al. | |
| 6,154,878 A | | 11/2000 | Saboff | |
| 6,182,119 B1 | * | 1/2001 | Chu | 709/206 |
| 6,185,734 B1 | | 2/2001 | Saboff et al. | |
| 6,195,750 B1 | * | 2/2001 | Ellsworth | 713/100 |
| 6,212,585 B1 | * | 4/2001 | Chrabaszcz | 710/302 |
| 6,311,232 B1 | * | 10/2001 | Cagle et al. | 710/8 |
| 6,314,516 B1 | * | 11/2001 | Cagle et al. | 713/1 |
| 6,343,360 B1 | * | 1/2002 | Feinleib | 713/1 |
| 6,470,436 B1 | | 10/2002 | Croft et al. | |
| 6,513,115 B2 | * | 1/2003 | Nock et al. | 713/100 |
| 6,539,381 B1 | | 3/2003 | Prasad et al. | |
| 6,622,159 B1 | | 9/2003 | Chao et al. | |
| 6,714,949 B1 | * | 3/2004 | Frey, Jr. | 707/200 |
| 6,871,344 B2 | | 3/2005 | Grier et al. | |
| 2002/0107977 A1 | * | 8/2002 | Dunshea et al. | 709/238 |
| 2002/0120724 A1 | * | 8/2002 | Kaiser et al. | 709/221 |
| 2003/0101245 A1 | * | 5/2003 | Srinivasan et al. | 709/221 |

OTHER PUBLICATIONS

Anonymous, The Jakarta Project, "Release Notes for: Apache Tomcat Version 3.3," http://jakarta.apache.org/tomcat/tomcat-3.3-doc/readme, Feb. 14, 2002, pp. 1-8 (Sections 4 and 6.4 Pertinent), printed Mar. 5, 2002.

* cited by examiner

Primary Examiner—Fritz M. Fleming
(74) Attorney, Agent, or Firm—Hickman Palermo Truong & Becker, LLP (57) ABSTRACT

A mechanism for reconfiguring a server without incurring any server down time is disclosed. At startup time, a server constructs a set of configuration data structures based upon a set of configuration information, and stores the data structures into a portion of the server's memory space. The server also updates a current configuration pointer to point to the configuration data structures to establish the data structures as the server's current configuration. Then, during normal operation, the server receives a reconfiguration signal. In response to this signal, the server constructs a new set of configuration data structures based upon a modified set of configuration information, and stores the new data structures into another portion of the server's memory space. Then, the server updates the current configuration pointer to point to the new configuration data structures to establish the new configuration data structures as the current server configuration. By doing so, the server changes its configuration. This change is implemented without shutting down and restarting the server.

40 Claims, 5 Drawing Sheets

MECHANISM FOR RECONFIGURING A SERVER WITHOUT INCURRING SERVER DOWN TIME

FIELD OF THE INVENTION

This invention relates generally to computer systems, and more particularly to a mechanism for enabling a server to be reconfigured without incurring server down time.

BACKGROUND

Many of today's servers, such as web servers, mail servers, and database servers, to name a few, rely upon configuration information to determine their behavior at runtime. For example, a web server may consult a set of configuration information to determine the number of threads it should allocate at any particular time. As a further example, a web server may use configuration information to determine how a particular request should be processed (e.g. which functions or applications should be invoked). Configuration information may be used to dictate many different aspects of server operation, and the type of behavior that can be controlled using configuration information will differ from server to server. One of the main advantages of using configuration information to dictate the behavior of a server rather than hardcoding the behavior into the server code is that it enables an end user, such as a system administrator, to easily control the operation of the server. By simply modifying the configuration information, an end user can customize the behavior of the server to fit his/her needs. No changing or recompilation of any of the server code is necessary.

Typically, to enable a set of configuration information to be used at runtime, a server interprets and digests the configuration information at system start up time. More specifically, at start up time, a server process is instantiated, and that server process interprets and transforms the configuration information into a set of runtime configuration data structures that are convenient for the server process to access and manipulate. Once the configuration data structures are created, they are used by the server process during runtime to process all requests.

In some circumstances, it may be desirable to alter the configuration information after a server process has been instantiated and running. For example, based upon usage history, a system administrator may wish to adjust the number of threads that are allocated by the server to optimize server performance. To implement a change in configuration (i.e. to reconfigure the server), it is currently necessary to carry out at least two steps. First, the underlying configuration information is modified. This may be done, for example, by using an editor, such as a text editor. Once the configuration information is modified, the server is shut down and restarted. Upon startup, a new server process is instantiated, and that new process interprets the modified configuration information and transforms it into a new set of runtime configuration data structures. The new data structures are thereafter used by the new server process to process all requests.

As noted above, it is currently necessary to shut down and restart a server in order to implement a change in the server's configuration. In many implementations, this is not a viable option. First of all, in a complex server, it can take on the order of minutes to restart a server. In terms of request traffic, three minutes is an extremely long time, and a tremendous amount of traffic can be lost in that time. Many servers, such as those servicing commercial websites, cannot afford to have this amount of down time. Also, many companies guarantee twenty-four hour service, seven days a week. For a server in such a company, down time is not a viable alternative.

This down time problem is especially onerous in servers in which configuration information is updated on a fairly regular basis. An example of such a server is an internet service provider (ISP) server that hosts a large number of websites/domain names. As a new customer signs on for the service, the configuration information is updated to include the new domain name. As an existing customer cancels service, the configuration information is updated to remove the existing domain name. As customers change their service requirements, the configuration information is altered to reflect the change. For a server that supports a large number of websites, the configuration information may be updated on a fairly regular basis. If the server were shut down to implement each and every update, the amount of down time that would be incurred would be prohibitively large. Because of this, many servers are forced to implement updates to configuration information as a batch on an infrequent basis (e.g. once a day), which is not an optimal solution. As the above discussion shows, the current methodology for reconfiguring a server leaves much to be desired. Accordingly, an improved server reconfiguration mechanism is needed.

SUMMARY OF THE INVENTION

In light of the shortcomings discussed above, the present invention provides an improved mechanism for reconfiguring a server, which enables the server to be reconfigured without incurring any server down time. According to one embodiment, server reconfiguration is implemented as follows. At system startup, a server process is instantiated (the terms server and server process will be used interchangeably herein), and based upon a set of configuration information, the server constructs a set of runtime configuration data structures. These data structures are stored in a portion of the server process's memory space, and a reference or pointer to that portion of the memory space is stored in a global variable.

Once constructed, the configuration data structures are used to process incoming requests. More specifically, in one embodiment, the server receives requests from clients to establish connections. In establishing a connection, the server consults the global variable to obtain the pointer to the configuration data structures, and associates that pointer with the connection. Thereafter, all requests, events, and activities on that connection are processed by the server in accordance with the configuration data structures.

At some point, the underlying configuration information is modified (e.g. by a system administrator) and the server receives a signal to reconfigure itself in accordance with the modified configuration information. In response to this signal, the server constructs a new set of runtime configuration data structures based upon the modified configuration information. In one embodiment, the server constructs the new data structures in much the same way as it did the first set of data structures, except that the new data structures are not constructed as part of a startup procedure. To construct the new data structures, the server does not need to be shut down and restarted.

While the server is constructing the new set of data structures, the global variable continues to store a pointer to the first set of data structures; hence, all connections established by the server while the new data structures are being constructed are associated with the first set of data structures. Consequently, all requests, events, and activities received on those connections are processed by the server in accordance with the first set of data structures.

Once the new configuration data structures are constructed and stored by the server into another portion of the server process's memory space, the pointer value in the global variable is updated atomically. More specifically, the server changes the pointer value in the global variable such that it points to the new set of data structures rather than the first set of data structures. By doing so, the server in effect changes its configuration. More specifically, by changing the pointer in the global variable, the server causes all future connections to be associated with the new set of data structures rather than the first set. This in turn causes all requests, events, and activities on those future connections to be processed in accordance with the new data structures. Since the new data structures reflect the modified configuration information, switching to the new data structures has the effect of changing the configuration of the server. In this manner, a smooth transition from the old configuration to the new configuration is achieved.

A point to note regarding this transition is that it is achieved without shutting down and restarting the server. Instead, the server is running and processing requests during the entire transition. Consequently, unlike the current methodology, the mechanism of the present invention incurs no server down time during server reconfiguration. By eliminating the need for server down time, the present invention overcomes the shortcomings of the current methodology, and provides a significant advance in the art.

DETAILED DESCRIPTION OF EMBODIMENT(S)

Functional Overview

Figure 1:
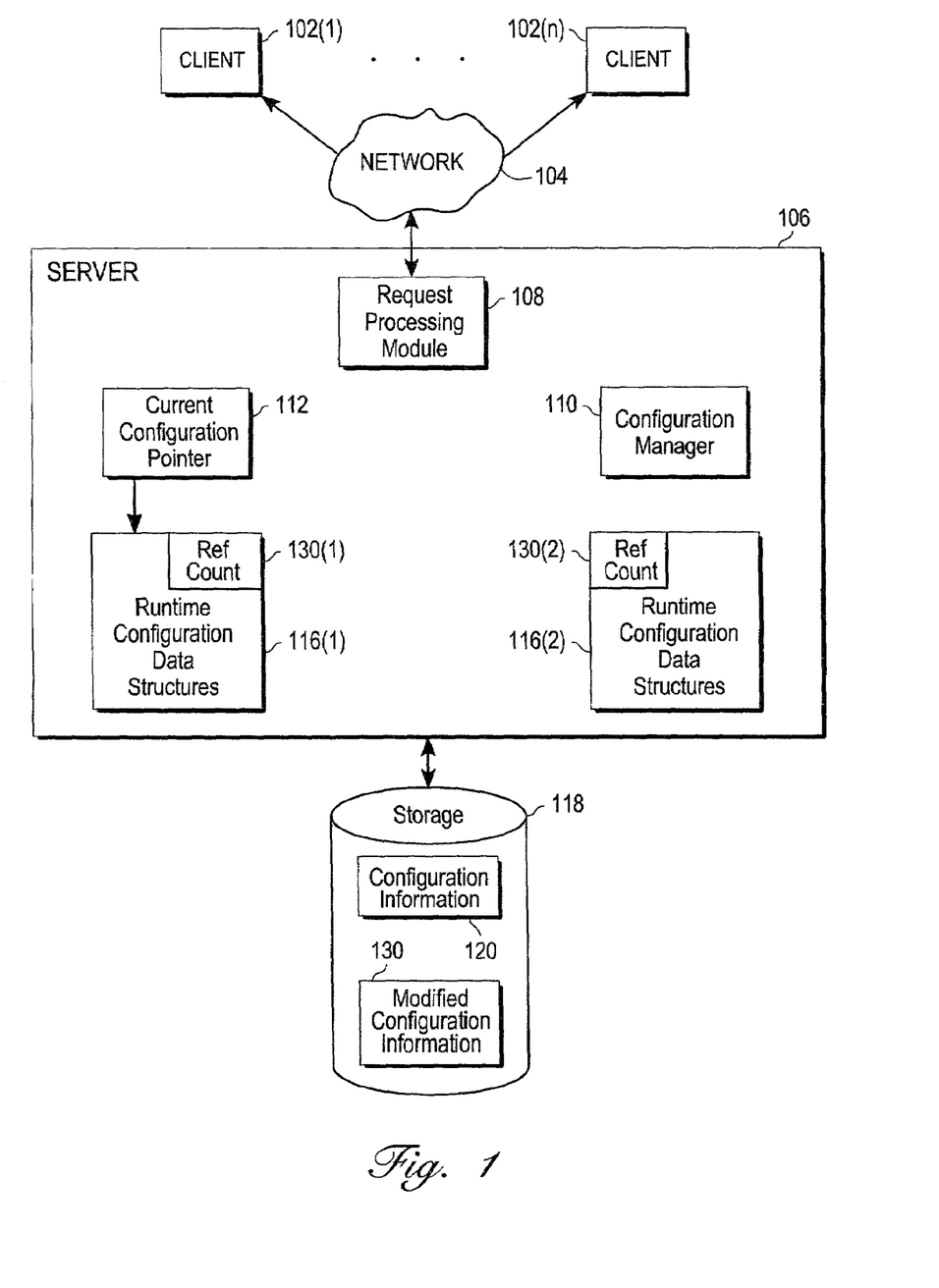
FIG. 1 is a functional block diagram of a system 100 in which one embodiment of the present invention may be implemented.

With reference to FIG. 1, there is shown a functional block diagram of a system 100 in which one embodiment of the present invention may be implemented, the system comprising a plurality of clients 102, a network 104, a server 106, and a storage 118. For purposes of illustration, the invention will be described below with reference to a web server 106. However, it should be noted that the invention is not so limited. Rather, the invention may be implemented in any type of server or computer system in which configuration information is used to define the behavior of a server. As used herein, the term configuration information refers broadly to any information that defines the behavior of a server, and that is used by the server to determine its operation or behavior at runtime. Examples of configuration information include but are not limited to: (1) virtual server definitions, including the definition of virtual server addresses, the mapping of domain names to IP addresses, and the specification of connections between certain sockets and certain virtual servers; (2) access control and security information that specifies, for example, which entities are allowed to access which resources; (3) resource management information, such as how many threads (e.g. acceptor threads) are to be allocated at system startup; (4) information specifying how requests are to be processed, such as which application is to be invoked in response to a particular URL; (5) information specifying a source for content, such as the root directory for a particular domain name; and (6) secure socket layer configuration information, such as the ciphers that are used to establish a connection and the digital certificates that are used to certify authenticity of important materials. These and other types of information may be specified as configuration information.

In system 100, each of the clients 102 maybe any mechanism capable of communicating with the server 106, including but not limited to a computer running a browser program. The client 102 may communicate with the server 106 using any known protocol, including but not limited to HTTP and FTP, and the client 102 communicates with the server 106 via the network 104. The network 104 may be any type of network, including but not limited to a local area network and a wide area network such as the Internet. The network 104 may even be as simple as a direct connection. Any mechanism capable of facilitating communication between the client 102 and the server 106 may serve as the network 104.

In system 100, the server 106 is the mechanism responsible for providing most of the functionality of the system 100. More specifically, the server 106 receives requests from the clients 102, and performs whatever operations are necessary to service the requests. In one embodiment, the mechanism responsible for servicing client requests is the request processing module 108. Among other functions, the request processing module 108 establishes connections with the clients 102, and processes whatever requests, events, and activities are received on those connections. In carrying out its functions, the request processing module 108 relies upon several sets of information, including a pointer 112, which points to the current set of runtime configuration data structures 116(1), and the configuration data structures 116(1) themselves. The pointer 112, which in one embodiment is stored as a global variable, enables the request processing module 108 to access the current set of configuration data structures 116(1), and the data structures 116(1) provide the request processing module 108 with the configuration information that it uses to determine its behavior in processing client requests. As will be explained in greater detail below, the request processing module 108 uses these sets of information in establishing connections with the clients 102, and in processing requests, events, and activities received on those connections.

In addition to the request processing module 108, the server 106 further comprises a configuration manager 110. In one embodiment, it is the configuration manager 110 that constructs and maintains the runtime configuration data structures 116 and the pointer 112. The configuration manager 110 manages the data structures 116 and the pointer 112 both at system startup time and during normal operation.

More specifically, at system startup time, the configuration manager 110 constructs the initial set of runtime configuration data structures 116(1) based upon the configuration information 120 stored in the storage 118. The configuration data structures 116(1) are effectively an internal server representation of the configuration information 120. These data structures 116(1) are easy and convenient for the request processing module 108 to access and to manipulate at runtime. Once constructed, the configuration data structures 116(1) may be used by the request processing module 108 to determine its behavior in servicing requests. To enable the request processing module 108 to access the initial set of data structures 116(1), the configuration manager 110 updates the pointer 112 to point to the data structures 116(1). Initial setup of the server's configuration is thus achieved.

Figure 1A:
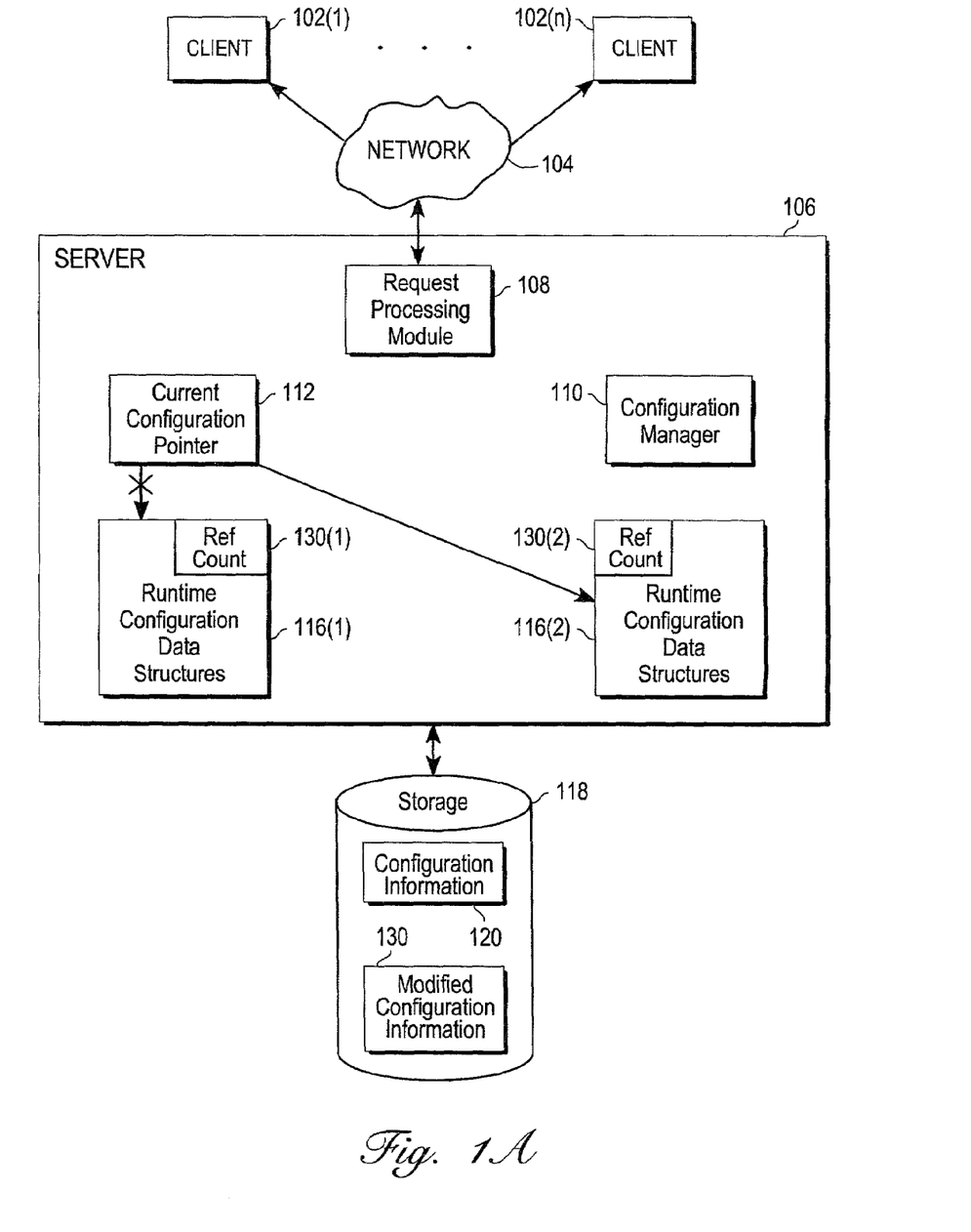
FIG. 1A is a pictorial representation illustrating the process of reconfiguring the server of FIG. 1.

During normal operation, the configuration manager 110 may receive a signal (e.g. from a system administrator) to reconfigure the server 106. More specifically, the configuration manager 110 may receive a signal to construct a new set of runtime configuration data structures based upon a modified set of configuration information 130. In response to such a signal, the configuration manager 110 accesses a set of modified configuration information 130 from the storage 118, and constructs a new set of runtime configuration data structures 116(2) based upon the modified configuration information 130. After the new data structures 116(2) are fully constructed, the configuration manager 110 updates the current configuration pointer 112 to point to the new set of configuration data structures 116(2) instead of the initial set of data structures 116(1). In one embodiment, this update operation is performed atomically (e.g. by using a lock) to prevent errors that may arise from other threads accessing the pointer 112 while it is being updated. A pictorial representation of the update operation is shown in FIG. 1A. By updating the current configuration pointer 112, the configuration manager 110 causes all server components (including the request processing module 108) that rely upon the pointer 112, to access the new data structures 116(2) instead of the initial set of data structures 116(2). By changing the pointer 112, thereby changing the set of configuration data structures the server 106 relies upon, the configuration manager 110 in effect changes the configuration of the server 106. In this manner, reconfiguration of the server 106 is achieved. As will be described in greater detail in a later section, reconfiguring the server 106 in this manner causes the request processing module 108 to associate future connections with the new data structures 116(2) rather than the initial set of data structures 116(1).

Several points should be noted at this juncture. First, note that in constructing the new runtime configuration data structures 116(2), the server 106 does not need to be shut down and restarted. Rather, the configuration manager 110 constructs the new data structures 116(2) as part of its normal operation. Thus, unlike the current methodology, the server 106 is reconfigured without incurring any server down time. Another point to note is that during the reconfiguration process, there is no significant slowdown in the server's request response time. Due to the simple and elegant manner in which the configuration manager 110 changes from one configuration to another, very little additional overhead is incurred during the reconfiguration process. Thus, the process is carried out quite efficiently. In addition, note that at certain points in time, there may be more than one set of runtime configuration data structures 116 used by the request processing module 108. Requests, events, and activities on some connections may be processed using one set of configuration data structures, while requests, events, and activities on other connections may be processed using another set of configuration data structures. Server 106 allows for this possibility. In fact, this aspect of the server 106 enables a smooth transition to be achieved from one configuration to another. The manner in which this transition is achieved will be described in greater detail in a later section. In FIG. 1, for the sake of simplicity, only two configuration data structures 116 are shown. It should be noted, though, that any number of configuration data structures 116 may exist in the server's memory space at any time.

In one embodiment, the server 106 is implemented in a multi-threaded environment. In such an environment, the request processing module 108 and the configuration manager 110 may be running on different threads, which means that they may run concurrently. As a result, while the configuration manager 110 is constructing a new set of configuration data structures 116(2), the request processing module 108 may continue to receive connection requests and establish new connections. These new connections will be associated with the initial set of configuration data structures 116(1). Until the current configuration pointer 112 is updated to point to the new set of configuration data structures 116(2), the new data structures 116(2) are not used by the request processing module 108 or any other server component. This helps to prevent errors and to facilitate a smooth transition from one configuration to another.

Modifying Configuration Information

As noted above, a user such as a system administrator may modify the configuration information 120 stored in the storage 118, and then signal the configuration manager 110 to reconfigure the server 106 according to the modified configuration information. In one embodiment, the user may do this using one or more utilities (not shown). For example, using an editor such as a text editor, the user may modify the configuration information 120. The modified configuration information 130 may be written over the original set of configuration information 120, or stored as a separate set of information 130, as shown in FIG. 1. Then, using a signaling utility, the user may send a signal (such as a UNIX signal in a UNIX-based environment) to the configuration manager 110 to instruct the configuration manager 110 to reconfigure the server 106. In one embodiment, the signaling utility provides to the configuration manager 110: (1) a reference to the modified configuration information 130; and (2) a signal to reconfigure the server 106. In response to this signal, the configuration manager 110 constructs the new configuration data structures 116(2) based upon the modified configuration information 130, and updates the current configuration pointer 112 to point to the new data structures 116(2), as discussed above.

Request Processing Module

Figure 2:
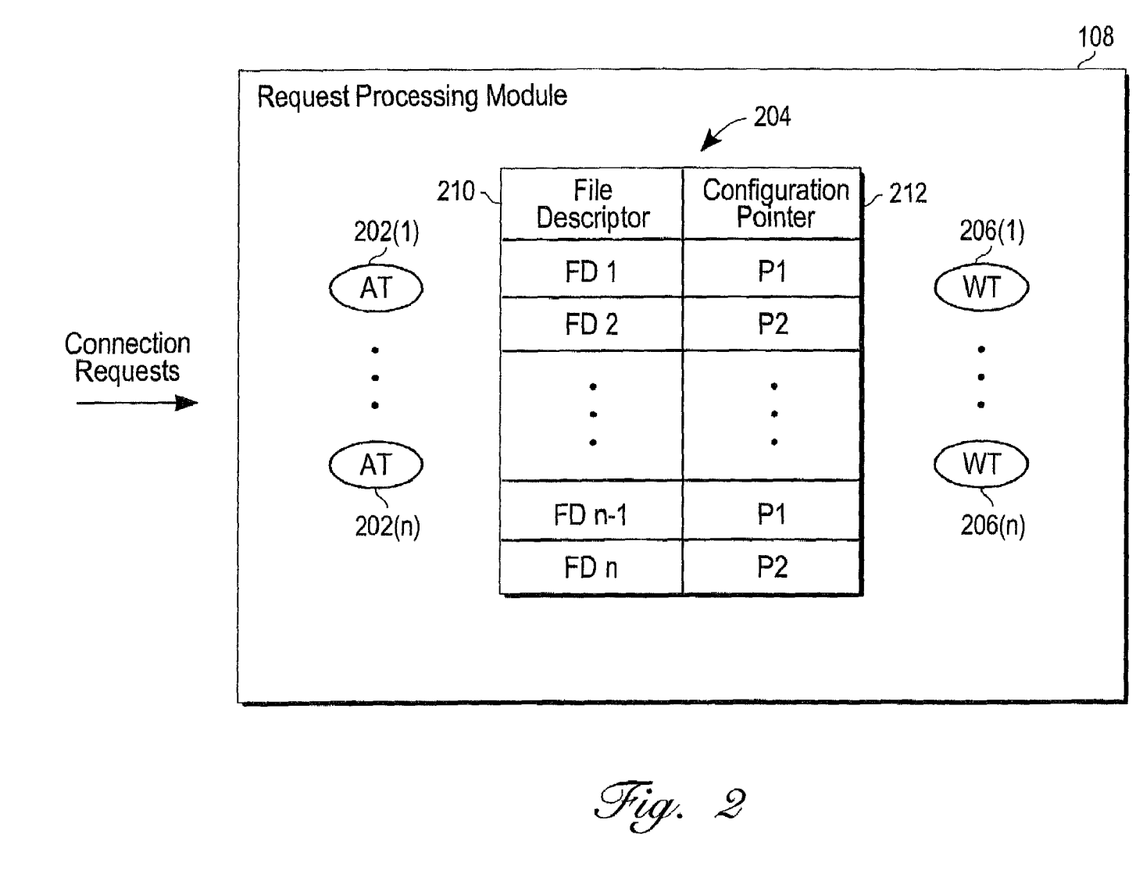
FIG. 2 is a functional diagram of one possible embodiment of the request processing module of FIG. 1.

As noted previously, it is the request processing module 108 that establishes connections with clients 102 and processes client requests. With reference to FIG. 2, which shows a functional diagram of one possible embodiment of the request processing module 108, the module 108 will now be described in greater detail. As shown in FIG. 2, the request processing module 108 comprises a plurality of acceptor threads 202, a plurality of worker threads 206, and a work queue 204.

In one embodiment, it is the acceptor threads 202 that are responsible for receiving connection requests from the clients 102, and establishing connections with the clients 102 in response to the requests. More specifically, when a connection request is received, an acceptor thread 202 is assigned to process it. In processing the connection request, the acceptor thread 202 receives a connection identifier from the operating system (not shown). In one embodiment, this identifier takes the form of a file descriptor, which uniquely identifies the connection in the server 106, and serves as a reference to a data structure (not shown) that contains all of the information pertaining to the connection. In one embodiment, by the time the acceptor thread 202 receives the file descriptor, the operating system will have already performed the multi-step handshaking process needed to establish a connection.

After the file descriptor is received, the acceptor thread 202 associates the pointer value currently in the current configuration pointer 112 with the file descriptor. By doing so, the acceptor thread 202 causes all subsequent processing (including processing of requests, events, and activities on that connection) to be performed in accordance with the current set of configuration data structures 116(1). In one embodiment, once a file descriptor is associated with a particular configuration pointer value, the association is not changed. Thus, even if the current configuration pointer 112 is later changed to point to another set of configuration data structures 116(2), the file descriptor is still associated with the pointer that points to the set of configuration data structures 116(1) that was current at the time the connection was established.

After the current configuration pointer 112 is associated with the file descriptor, the reference count 130(1) of the configuration data structures 116(1) pointed to by the pointer 112 is incremented. By incrementing the reference count 130(1) whenever a new connection is associated with the data structures 116(1), and decrementing the reference count 130(1) whenever a connection associated with the data structures 116(1) is closed, an accurate count can be kept of how many connections are relying on the data structures 116(1) for configuration information. If the reference count 130(1) ever indicates that no connections are using the configuration data structures 116(1), then the memory space consumed by the data structures 116(1) may be released and used for other purposes. This will be discussed in greater detail in a later section. After the acceptor thread 202 increments the reference count 130(1), it stores the file descriptor and the current configuration pointer 112 into an entry of the work queue 204. More specifically, the file descriptor is stored into the File Descriptor column 210, and the pointer to the current configuration is stored into the Configuration Pointer column 212 of the work queue 204. Thereafter, as requests, events, and activities are received on the connection, the entry is retrieved from the work queue 204 and processed by a worker thread 206. After storing the entry into the work queue 204, the acceptor thread 202 terminates processing of the current connection request and proceeds to process another one.

A point to note at this juncture is that different entries in the work queue 204 may have different configuration pointers associated therewith. This may happen, for example, if different connections are established at different times and if a server reconfiguration was implemented between the times. For example, suppose that a first connection is established at a time during which the current configuration data structures are data structures 116(1). In that case, the pointer to data structures 116(1) is associated with the connection. Suppose however that a second connection is established at a time during which the current configuration data structures are data structures 116(2). For this connection, the pointer to data structures 116(2) is associated therewith. Because connections may be established and inserted into the work queue 204 at different times, and because different configuration data structures 116 may be current at different times, different entries in the work queue 204 may have different configuration pointers associated therewith. This is an acceptable condition in the request processing module 108.

At some point after a connection is established, one or more requests, events, and activities (referred to below as requests for the sake of simplicity) will most likely be received on the connection. As that occurs, one of the worker threads 206 is assigned to the connection to process the requests. In processing one or more requests on a connection, the worker thread 206 first extracts the entry pertaining to that connection from the work queue 206. Then, using the file descriptor of the entry, the worker thread 206 accesses the data structure (not shown) containing the information pertaining to that connection. In addition, the worker thread 206 uses the configuration pointer of the entry to access the configuration data structures with which the entry is associated (for the sake of example, it will be assumed that data structures 116(1) are associated with the connection). Armed with the connection information and the configuration information, the worker thread 206 processes the requests received on the connection in accordance with the configuration data structures 116(1).

Note that the configuration data structures 116(1) used to process the requests may be different from the configuration data structures that are currently pointed to by the current configuration pointer 112, because the pointer 112 may have been updated since the time the connection was established. This is an acceptable condition. So long as the configuration data structures 116(1) associated with the connection are still accessible (and they are guaranteed to be because of the reference count 130), the requests will be processed properly by the worker thread 206.

In the process of servicing requests, a worker thread 206 may receive a request from a client to close the connection. If such a command is received, the connection will be closed. To do so, the worker thread 206 releases the file descriptor and the data structure referenced by the file descriptor to eliminate references to the connection. In addition, the worker thread 206 decrements the reference count 130(1) of the configuration data structures 116(1) with which the connection is associated. By doing so, the worker thread 206 maintains the reference count at the proper level. Thereafter, the worker thread 206 checks the value of the reference count 130(1). If the reference count 130(1) indicates that no more connections are relying upon that set of configuration data structures 116(1), then those data structures 116(1) are released or destroyed. In one embodiment, the worker thread 206 releases or destroys the configuration data structures 116(1) by freeing the memory space occupied by the data structures 116(1). By doing so, the worker thread 206 enables the memory space to be used for other purposes. In this manner, obsolete configuration data structures are removed from the server's memory space.

When a worker thread 206 extracts an entry from the work queue 204 for processing, in addition to the functions described above, the worker thread 206 may further check to see if the connection has been idle for at least a certain period of time. If so, then the worker thread 206 will close the connection to prevent idle connections from clogging up the work queue 204. To close the connection, the worker thread 206: (1) releases the file descriptor associated with the connection and the data structure referenced by the file descriptor to eliminate references to the connection; and (2) decrements the reference count 130 of the configuration data structures 116 with which the connection is associated. Thereafter, the worker thread 206 checks the value of the reference count 130. If the reference count 130 indicates that no more connections are relying upon that set of configuration data structures 116, then those data structures 116 are released or destroyed. As described above, the worker thread 206 releases or destroys a set of configuration data structures 116 by freeing the memory space occupied by the data structures 116. By removing obsolete configuration data structures 116 from the server's memory space, the worker thread 206 makes efficient use of the memory space.

Configuration Manager

As noted previously, it is the configuration manager 110 that is responsible for constructing and maintaining the configuration data structures 116 and the current configuration pointer 112. With reference to the operational flow diagram of FIG. 3, the operation of the configuration manager 110 will now be described.

Figure 3:
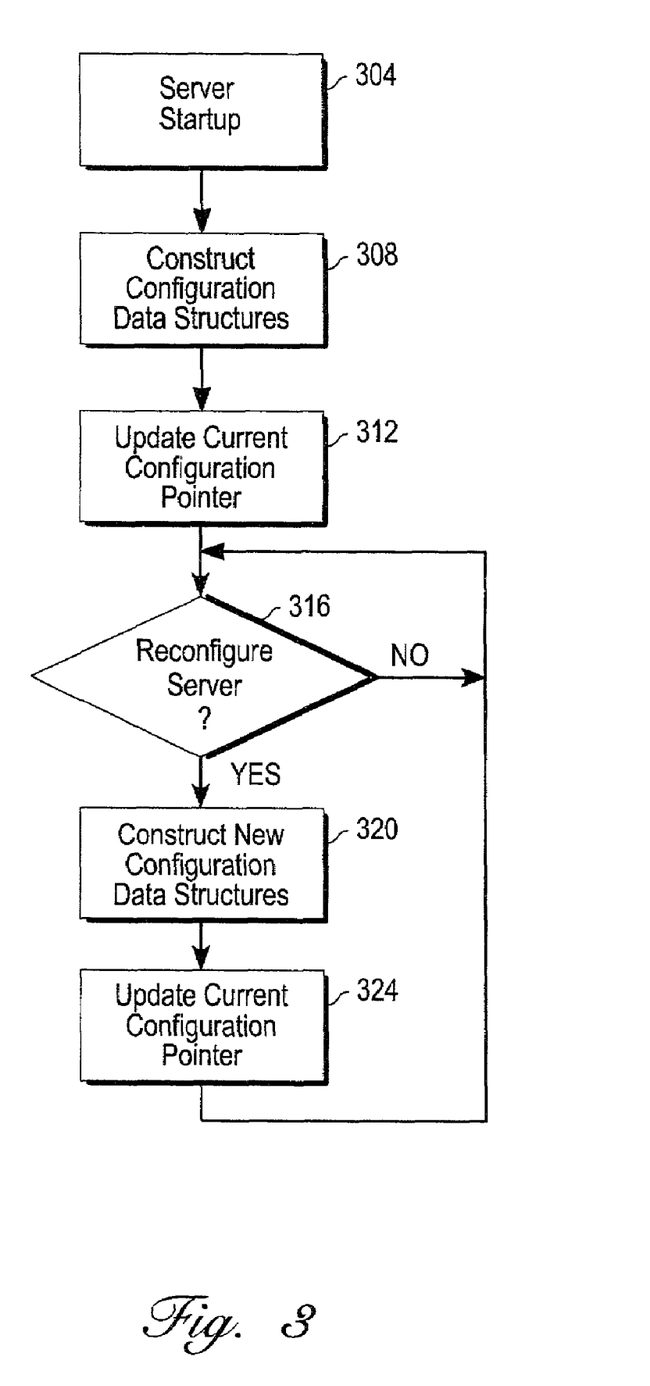
FIG. 3 is an operational flow diagram illustrating a sample operation of the configuration manager of FIG. 1.

Operation of the configuration manager 116 begins at system startup (304). More specifically, the configuration manager 110 is instantiated at startup time, and once instantiated, it proceeds to construct (308) an initial set of configuration data structures 116(1). In doing so, the configuration manager 110 accesses a set of configuration information 120 from a storage 118, and transforms the configuration information into a set of internal data structures 116(1). These data structures 116(1) are basically internal server representations of the configuration information 120, which are preprocessed to facilitate access at runtime by various components of the server 106 (including the request processing module 108). The manner in which the data structures 116(1) is constructed, and the form that they take within the server 106 will differ from implementation to implementation. As the data structures 116(1) are constructed, they are stored within a portion of the server's memory space. Once construction of the data structures 116(1) is completed, the configuration manager 110 updates (312) the current configuration pointer 112 (which in one embodiment takes the form of a global variable) to point to the memory space occupied by the configuration data structures 116(1), thereby declaring the data structures 116(1) to be the current server configuration. In addition, the configuration manager 110 increments the reference count 130(1) of the data structures 116(1) (the current configuration pointer 112 counts as a reference). Once that is done, the server 106 is configured and is ready for operation. At that point, the request processing module 108 may begin establishing connections and servicing requests on those connections using the current configuration pointer 112 and the configuration data structures 116(1), as described above.

After the initial set of configuration data structures 116(1) is constructed, the configuration manager 110 enters a monitoring mode wherein it monitors (316) for a signal indicating that the server 106 is to be reconfigured. If no such signal is detected, then the configuration manger 110 loops back to continue checking for the signal. However, if such a signal (e.g. a Unix signal) is received, then the configuration manager 110 proceeds to construct (320) a new set of configuration data structures. In one embodiment, when the reconfiguration signal is sent to the configuration manager 110, a reference to a modified set of configuration information 130 is also provided. Using the reference to access the modified configuration information 130 stored in the storage 118, the configuration manager 110 constructs a new set of configuration data structures 116(2) based upon the modified configuration information 130. In one embodiment, the configuration manager 110 constructs the new data structures 116(2) in much the same way as it did the initial set of data structures 116(1), except that the new data structures 116(2) are not constructed as part of a startup procedure.

As the new configuration data structures 116(2) are constructed, they are stored into another portion of the server's memory space. A point to note here is that while the new configuration data structures 116(2) are being constructed, the current configuration pointer 112 is not changed. That is, it still points to the initial set of configuration data structures 116(1). As a result, all connections established by the request processing module 108 during construction of the new data structures 116(2) will be associated with the initial set of data structures 116(1), not the new set 116(2).

After the new configuration data structures 116(2) are completely constructed, the configuration manager 110 updates (324) the current configuration pointer 112 to point to the new configuration data structures 116(2). In one embodiment, this update is performed atomically (for example, by using a lock) to prevent other threads from accessing the pointer 112 while it is being updated. After the pointer 112 is updated, the reference count 130(2) of the new data structures 116(2) is incremented, and the reference count 130(1) of the initial set of data structures 116(1) is decremented. Thereafter, the configuration manager 110 checks the value of the reference count 130(1). If the reference count 130(1) indicates that no more connections are relying upon the initial set of data structures 116(1), then those data structures 116(1) are released or destroyed. In one embodiment, the configuration manager 110 releases or destroys the data structures 116(1) by freeing the memory space occupied thereby.

Once the current configuration pointer 112 is updated, the new configuration data structures 116(2) are established as the current server configuration, and are used by the various server components to govern their behavior. In this manner, the configuration of the server 106 is changed from one configuration 116(1) to another 116(2) without shutting down and restarting the server 106. After the change in configuration is completed, the request processing module 108 will associate new connections with the new set of configuration data structures 116(2) rather than the old set 116(1). After the server 106 is reconfigured, the configuration manager 110 loops back to (316) to monitor for another reconfiguration signal. In the manner described, the configuration manager 110 reconfigures the server 106 smoothly, efficiently, and without incurring any server down time.

Hardware Overview

Figure 4:
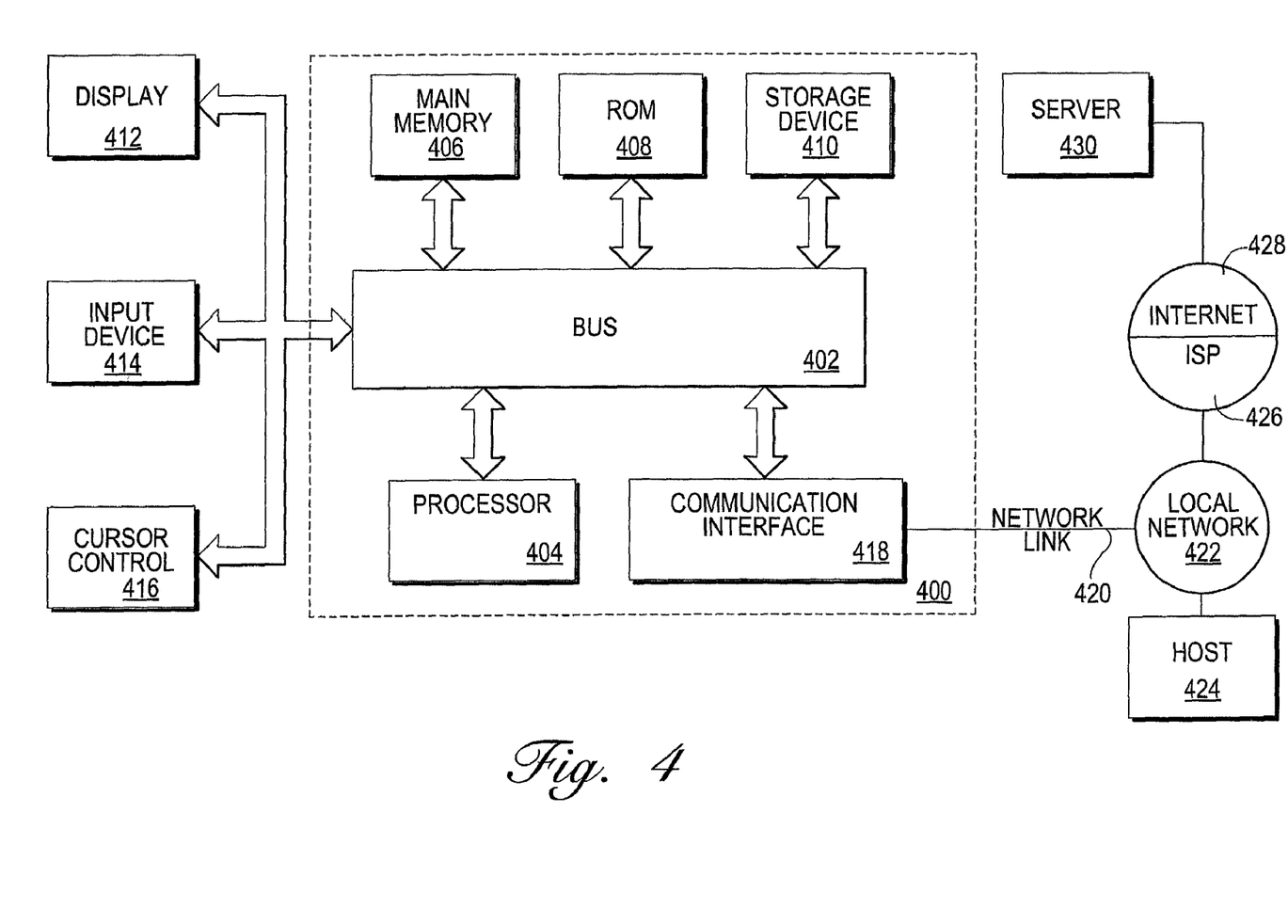
FIG. 4 is a hardware block diagram of a computer system in which one embodiment of the present invention may be implemented.

In one embodiment, the server 106 of the present invention and its various components are implemented as a set of instructions executable by one or more processors. The invention may be implemented as part of an object oriented programming system, including but not limited to the JAVA™ programming system manufactured by Sun Microsystems, Inc. of Palo Alto, Calif. FIG. 4 shows a hardware block diagram of a computer system 400 in which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 may also be further used to store temporary variables or other intermediate information during execution of instructions by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

According to one embodiment, the functionality of the present invention is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A method for reconfiguring a server executing on a computer, comprising:

receiving, at runtime, a reconfiguration request to reconfigure said server, wherein said server has a current configuration which is defined by a first set of configuration data structures, and wherein said current configuration dictates the manner in which said server processes client requests;

constructing a second set of configuration data structures which is different from said first set of configuration data structures, said second set of configuration data structures defining a new configuration for said server; and without shutting down and restarting said server, causing said server to reference said second set of configuration data structures instead of said first set of configuration data structures when processing selected client requests, thereby reconfiguring said server from said current configuration to said new configuration such that said new configuration dictates the manner in which said server processes selected client requests;

wherein said first set of data structures may be accessed and used by said server in processing a client request even after said server has been reconfigured from said current configuration to said new configuration.

2. The method of claim 1, wherein causing said server to reference said second set of configuration data structures comprises:

updating a configuration reference to reference said second set of configuration data structures rather than said first set of configuration data structures.

3. The method of claim 2, wherein said configuration reference is updated atomically.

4. The method of claim 2, wherein updating said configuration reference comprises:

obtaining a lock on said configuration reference;

modifying said configuration reference to cause it to reference said second set of configuration data structures; and releasing said lock on said configuration reference.

5. The method of claim 1, wherein said server is reconfigured from said current configuration to said new configuration without destroying said first set of configuration data structures.

6. The method of claim 1, wherein said server is reconfigured from said current configuration to said new configuration without modifying said first set of configuration data structures.

7. The method of claim 1, wherein said server is reconfigured from said current configuration to said new configuration without overwriting any portion of said first set of configuration data structures with any portion of said second set of configuration data structures.

8. The method of claim 1, wherein said first set of configuration data structures may exist even after said server has been reconfigured from said current configuration to said new configuration.

9. The method of claim 1, wherein said first and second sets of configuration data structures may exist concurrently.

10. The method of claim 1, wherein constructing said second set of configuration data structures comprises:

accessing a set of configuration information; and constructing said second set of configuration data structures based upon said set of configuration information.

11. The method of claim 1, wherein said reconfiguration request comprises a reference to a set of configuration information, and wherein constructing said second set of configuration information comprises:

accessing said set of configuration information using said reference; and constructing said second set of configuration data structures based upon said set of configuration information.

12. A computer readable storage medium, comprising:

instructions for causing one or more processors to receive, at runtime, a reconfiguration request to reconfigure a server, wherein said server has a current configuration which is defined by a first set of configuration data structures, and wherein said current configuration dictates the manner in which said server processes client requests;

instructions for causing one or more processors to construct a second set of configuration data structures which is different from said first set of configuration data structures, said second set of configuration data structures defining a new configuration for said server; and instructions for causing one or more processors to cause, without shutting down and restarting said server, said server to reference said second set of configuration data structures instead of said first set of configuration data structures when processing selected client requests, thereby reconfiguring said server from said current configuration to said new configuration such that said new configuration dictates the manner in which said server processes selected client requests;

wherein said first set of data structures may be accessed and used by said server in processing a client request even after said server has been reconfigured from said current configuration to said new configuration.

13. The computer readable storage medium of claim 12, wherein the instructions for causing one or more processors to cause said server to reference said second set of configuration data structures comprises:

instructions for causing one or more processors to update a configuration reference to reference said second set of configuration data structures rather than said first set of configuration data structures.

14. The computer readable storage medium of claim 13, wherein said configuration reference is updated atomically.

15. The computer readable storage medium of claim 13, wherein the instructions for causing one or more processors to update said configuration reference comprises:

instructions for causing one or more processors to obtain a lock on said configuration reference;

instructions for causing one or more processors to modify said configuration reference to cause it to reference said second set of configuration data structures; and instructions for causing one or more processors to release said lock on said configuration reference.

16. The computer readable storage medium of claim 12, wherein said server is reconfigured from said current configuration to said new configuration without destroying said first set of configuration data structures.

17. The computer readable storage medium of claim 12, wherein said server is reconfigured from said current configuration to said new configuration without modifying said first set of configuration data structures.

18. The computer readable storage medium of claim 12, wherein said server is reconfigured from said current configuration to said new configuration without overwriting any portion of said first set of configuration data structures with any portion of said second set of configuration data structures.

19. The computer readable storage medium of claim 12, wherein said first set of configuration data structures may exist even after said server has been reconfigured from said current configuration to said new configuration.

20. The computer readable storage medium of claim 12, wherein said first and second sets of configuration data structures may exist concurrently.

21. The computer readable storage medium of claim 12, wherein the instructions for causing one or more processors to construct said second set of configuration data structures comprises:

instructions for causing one or more processors to access a set of configuration information; and instructions for causing one or more processors to construct said second set of configuration data structures based upon said set of configuration information.

22. The computer readable storage medium of claim 12, wherein said reconfiguration request comprises a reference to a set of configuration information, and wherein the instructions for causing one or more processors to construct said second set of configuration information comprises:

instructions for causing one or more processors to access said set of configuration information using said reference; and instructions for causing one or more processors to construct said second set of configuration data structures based upon said set of configuration information.

23. A method performed by a server executing on a computer, the method comprising:

transitioning from a former configuration defined by a first set of configuration data structures to a current configuration defined by a second set of configuration data structures;

after transitioning to said current configuration:

processing a first request associated with said former configuration by accessing and using said first set of configuration data structures; and processing a second request associated with said current configuration by accessing and using said second set of configuration data structures.

24. The method of claim 23, wherein said server transitions from said former configuration to said current configuration without shutting down and restarting.

25. The method of claim 23, further comprising:

prior to transitioning from said former configuration to said current configuration:

receiving a connection request;

creating a new connection in response to said connection request; and associating said new connection with said first set of configuration data structures such that all future client requests received on said new connection are processed in accordance with said former configuration.

26. The method of claim 25, further comprising:

after transitioning from said former configuration to said current configuration:

receiving a second connection request;

creating a second new connection in response to said second connection request; and associating said second new connection with said second set of configuration data structures such that all future client requests received on said second new connection are processed in accordance with said current configuration.

27. The method of claim 23, wherein transitioning from said former configuration to said current configuration comprises:

updating a configuration reference to reference said second set of configuration data structures instead of said first set of configuration data structures.

28. The method of claim 23, wherein transitioning from said former configuration to said current configuration comprises:

receiving, at runtime, a reconfiguration request;

constructing said second set of configuration data structures; and referencing said second set of configuration data structures instead of said first set of configuration data structures when processing selected client requests.

29. The method of claim 23, further comprising:

determining whether said first set of configuration data structures is still referenced by at least one entity; and in response to a determination that said first set of configuration data structures is not still referenced by at least one entity, purging said first set of configuration data structures.

30. The method of claim 29, wherein said first set of configuration data structures occupies one or more blocks of memory, and wherein purging said first set of configuration data structures comprises:

releasing said one or more blocks of memory.

31. The method of claim 29, wherein determining whether said first set of configuration data structures is still referenced by at least one entity, comprises:

determining whether a reference count associated with said first set of configuration data structures has been reduced to a predetermined value which indicates that no entities are referencing said first set of configuration data structures.

32. A computer readable storage medium comprising:

instructions for causing one or more processors to transition a server from a former configuration defined by a first set of configuration data structures to a current configuration defined by a second set of configuration data structures;

instructions for causing one or more processors to process, after transitioning to said current configuration, a first request associated with said former configuration by accessing and using said first set of configuration data structures; and instructions for causing one or more processors to process, after transitioning to said current configuration, a second request associated with said current configuration by accessing and using said second set of configuration data structures.

33. The computer readable storage medium of claim 32, wherein said server transitions from said former configuration to said current configuration without shutting down and restarting.

34. The computer readable storage medium of claim 32, further comprising:

instructions for causing one or more processors to receive, prior to transitioning from said former configuration to said current configuration, a connection request;

instructions for causing one or more processors to create, prior to transitioning from said former configuration to said current configuration, a new connection in response to said connection request; and instructions for causing one or more processors to associate, prior to transitioning from said former configuration to said current configuration, said new connection with said first set of configuration data structures such that all future client requests received on said new connection are processed in accordance with said former configuration.

35. The computer readable storage medium of claim 34, further comprising:

instructions for causing one or more processors to receive, after transitioning from said former configuration to said current configuration, a second connection request;

instructions for causing one or more processors to create, after transitioning from said former configuration to said current configuration, a second new connection in response to said second connection request; and instructions for causing one or more processors to associate, after transitioning from said former configuration to said current configuration, said second new connection with said second set of configuration data structures such that all future client requests received on said second new connection are processed in accordance with said current configuration.

36. The computer readable storage medium of claim 32, wherein the instructions for causing one or more processors to transition from said former configuration to said current configuration comprises:

instructions for causing one or more processors to update a configuration reference to reference said second set of configuration data structures instead of said first set of configuration data structures.

37. The computer readable storage medium of claim 32, wherein the instructions for causing one or more processors to transition from said former configuration to said current configuration comprises:

instructions for causing one or more processors to receive, at runtime, a reconfiguration request;

instructions for causing one or more processors to construct said second set of configuration data structures; and instructions for causing one or more processors to reference said second set of configuration data structures instead of said first set of configuration data structures when processing selected client requests.

38. The computer readable storage medium of claim 32, further comprising:

instructions for causing one or more processors to determine whether said first set of configuration data structures is still referenced by at least one entity; and instructions for causing one or more processors to purge, in response to a determination that said first set of configuration data structures is not still referenced by at least one entity, said first set of configuration data structures.

39. The computer readable storage medium of claim 38, wherein said first set of configuration data structures occupies one or more blocks of memory, and wherein the instructions for causing one or more processors to purge said first set of configuration data structures comprises:

instructions for causing one or more processors to release said one or more blocks of memory.

40. The computer readable storage medium of claim 38, wherein the instructions for causing one or more processors to determine whether said first set of configuration data structures is still referenced by at least one entity, comprises:

instructions for causing one or more processors to determine whether a reference count associated with said first set of configuration data structures has been reduced to a predetermined value which indicates that no entities are referencing said first set of configuration data structures.

* * * * *